United States Patent [19]
Boyer et al.

[11] Patent Number: 5,605,569
[45] Date of Patent: Feb. 25, 1997

[54] PRECIPITATED SILICA HAVING HIGH SODIUM SULFATE CONTENT

[75] Inventors: James L. Boyer, Monroeville; Thomas G. Krivak, Harrison City; Harold E. Swift, Gibsonia; Robert C. Wang, Wexford, all of Pa.

[73] Assignee: PPG Industries, Inc., Pittsburgh, Pa.

[21] Appl. No.: 555,552

[22] Filed: Nov. 8, 1995

[51] Int. Cl.⁶ .......................... C04B 14/04; C01B 33/12
[52] U.S. Cl. .................... 106/482; 106/492; 423/335; 423/339
[58] Field of Search .................... 106/482, 492; 423/335, 339

[56] References Cited

U.S. PATENT DOCUMENTS

| | | | |
|---|---|---|---|
| 2,657,149 | 10/1953 | Iler | 106/308 |
| 2,772,322 | 11/1956 | Witt et al. | 136/146 |
| 3,351,495 | 11/1967 | Larsen et al. | 136/146 |
| 3,696,061 | 10/1972 | Selsor et al. | 260/2.5 M |
| 3,798,294 | 3/1974 | Hollenbeck | 264/41 |
| 3,928,541 | 12/1975 | Wason | 106/492 |
| 4,024,323 | 5/1977 | Versteegh | 429/249 |
| 4,038,098 | 7/1977 | Wason | 106/492 |
| 4,076,549 | 2/1978 | Wason | 106/492 |
| 4,132,806 | 1/1979 | Wason | 424/357 |
| 4,190,707 | 2/1980 | Doi et al. | 429/254 |
| 4,210,709 | 7/1980 | Doi et al. | 429/250 |
| 4,237,083 | 12/1980 | Young | 264/41 |
| 4,243,428 | 1/1981 | Donnet et al. | 106/492 |
| 4,331,622 | 5/1982 | Doi et al. | 264/45.3 |
| 4,335,193 | 6/1982 | Doi et al. | 429/251 |
| 4,495,167 | 1/1985 | Nauroth et al. | 423/339 |
| 4,648,417 | 3/1987 | Johnson et al. | 134/105 |
| 4,681,750 | 7/1987 | Johnson et al. | 423/339 |
| 4,734,229 | 3/1988 | Johnson et al. | 264/40.6 |
| 5,094,829 | 3/1992 | Krivak et al. | 423/339 |
| 5,342,598 | 8/1994 | Persello | 423/339 |

Primary Examiner—Mark L. Bell
Assistant Examiner—Louis M. Troilo
Attorney, Agent, or Firm—George D. Morris

[57] ABSTRACT

Particles comprising particulate amorphous precipitated silica in association with from 5 to 10 percent by weight sodium sulfate and less than 10 percent by weight water, wherein the percentages are based on the weight of the silica, the sodium sulfate, and the water, which particles have a BET surface area of from 100 to 300 m²/g, a total intruded volume from 1.8 to 3.6 cm³/g, and a DBP oil absorption of from 180 to 320 cm³/100 g, may be employed in microporous battery separators to introduce all or a portion of the desired sodium sulfate to the battery electrolyte. Moreover the enhanced amount of sodium sulfate enhances silica characteristics and battery separator production.

10 Claims, No Drawings

PRECIPITATED SILICA HAVING HIGH SODIUM SULFATE CONTENT

Storage batteries of the lead-acid type are well known. Such batteries ordinarily employ electrolyte based primarily on sulfuric acid. Sodium sulfate has often been added to the electrolyte for a variety of purposes. Among the purposes reported in the patent literature are improved recovery performance upon discharge, reduced short circuit problem, assistance in maintaining electrolyte density during discharge, improvement in cell life by reducing corrosion and shrinkage of cathode panels, and reduced charging time.

Lead-acid storage batteries often employ battery separators. Battery separators are microporous diaphragms placed between the positive and negative plates of a battery. Such separators may have smooth surfaces on one or both sides or have ribs or dimples on one or both sides. Particularly effective microporous battery separators are those containing polyolefin matrices and having particulate amorphous precipitated silica distributed throughout the matrix. The polyolefin preferably comprises ultrahigh molecular weight polyethylene which may or may not be in admixture with one or more other polymers. Heretofore the sodium sulfate content of the particulate amorphous precipitated silica used in battery separators has been less than 2 percent by weight. Such microporous battery separators and their preparation are described in U.S. Pat. Nos. 3,351,495; 4,237,083; 4,648,417; and 4,734,229.

It has now been found that particulate amorphous precipitated silica containing at least 5 percent by weight sodium sulfate may be employed in microporous battery separators to introduce all or a portion of the desired sodium sulfate to the battery electrolyte. Accordingly, the present invention is particles comprising particulate amorphous precipitated silica in association with from 5 to 10 percent by weight sodium sulfate and less than 10 percent by weight water, wherein the percentages are based on the weight of the silica, the sodium sulfate, and the water; the particles having a BET surface area of from 100 to 300 $m^2/g$, a total intruded volume from 1.8 to 3.6 $cm^3/g$, and a DBP oil absorption of from 180 to 320 $cm^3/100$ g.

The enhanced amount of sodium sulfate enhances silica characteristics in that it increases bulk density thereby reducing transportation costs and minimizing storage and customer mixing volume requirements. It enhances battery separator production by (1) reducing the oil absorption of the silica freeing more process oil for polymer solvation, (2) increasing the extrusion feed blend bulk density allowing more efficient feeding, (3) improving flow properties such as angle of repose, and/or (4) reducing mixer volume swell during the initial stages of blend mixing.

The sodium sulfate content of the particulate amorphous precipitated silica of the present invention is from 5 to 10 percent by weight based on the weight of silica, sodium sulfate, and water. Preferably the sodium sulfate content is from 6 to 8 percent by weight on the same basis. As used herein and in the claims the weight percent of sodium sulfate is determined by X-ray fluorescence.

The water content of the particles of the present invention is less than 10 percent by weight based on the weight of silica, sodium sulfate, and water. Often the water content is less than 8 percent by weight on the same basis. Preferably the water content is less than 6 percent by weight on the same basis. As used herein and in the claims, the water content is determined using a sample of the particles weighing between 10 and 11 grams and an Ohaus® moisture balance (Ohaus Corporation, Florham Park, N.J.) with settings at 160° C. and 10 minutes.

Although both are silicas, it is important to distinguish amorphous precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579.

Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used.

Amorphous precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Amorphous precipitated silica, then, may be described as precipitated aggregates of ultimate particles of colloidal amorphous silica that have not at any point existed as macroscopic gel during the preparation. The sizes of the aggregates and the degree of hydration may vary widely.

Amorphous precipitated silica powders differ from silica gels that have been pulverized in ordinarily having a more open structure, that is, a higher specific pore volume. However, the specific surface area of precipitated silica as measured by the Brunauer, Emmett, Teller (BET) method using nitrogen as the adsorbate, is often lower than that of silica gel.

Many different particulate amorphous precipitated silicas are known and have been used in a wide variety of applications. Particulate amorphous precipitated silicas are commonly produced by precipitation from an aqueous solution of sodium silicate using sulfuric acid. Processes for producing amorphous precipitated silicas from sodium silicate solutions and sulfuric acid are described in detail in U.S. Pat. Nos. 2,657,149; 4,132,806; 4,495,167, 4,681,750, and 5,094,829. The particulate amorphous precipitated silicas of the present invention may be precipitated by acidifying sodium silicate solutions with sulfuric acid in the manner of the prior art and then, if necessary, washing the precipitate only until the precipitate contains from 5 to 10 percent by weight sodium sulfate on a dry basis, and then drying until the water content has been established at less than 10 percent by weight.

The BET surface area of the particles of the present invention is usually from 100 to 300 square meters per gram ($m^2/g$). Often the BET surface area is from 120 to 220 $m^2/g$. From 140 to 180 $m^2/g$ is preferred. As used in the present specification and claims, the BET surface area of the particles is the surface area determined by the Brunauer, Emmett, Teller (BET) method according to ASTM C 819–77 using nitrogen as the adsorbate but modified by outgassing the system and the sample for one hour at 180° C.

The total intruded volume of the particles of the present invention is generally from 1.8 to 3.6 cubic centimeters per gram ($cm^3/g$). Often the total intruded volume is from 1.9 to 3.2 $cm^3/g$. Preferably the total intruded volume is from 2 to 3.2 $cm^3/g$. As used herein and in the claims the total intruded volume is the total volume of mercury which is intruded into a sample of the particles during a high pressure scan (from about 103 kilopascals absolute to about 227 megapascals absolute) using an Autoscan mercury porosimeter (Quantachrome Corp.) in accordance with the accompanying operating manual, divided by the mass of the sample under test.

The DBP oil absorption of the particles of the present invention is most often from 180 to 320 cubic centimeters per 100 grams ($cm^3/100$ g). Frequently the DBP oil absorption is from 190 to 270 $cm^3/100$ g. From 195 to 240 $cm^3/100$ g is preferred. As used in the present specification and claims, DBP oil absorption of the particles is determined according to ASTM D 2414-93 using dibutyl phthalate [CAS 84-74-2] as the absorbate and a Type E Absorptometer with the procedure modified as follows: (1) a sample of the particles weighing 12.5±0.1 grams which is not further dried is introduced to the Type E Absorptometer, (2) the moisture content of another sample of the particles silica weighing between 10 and 11 grams is determined using an Ohaus® moisture balance with settings at 160° C. and 10 minutes, and (3) the DBP oil absorption is calculated from the equation:

$$OA = 100V/S + 3.9(M - 1.7)$$

where:

OA is the DBP oil absorption, $cm^3/100$ g,

V is the volume of dibutyl phthalate used, $cm^3$,

S is the weight of the sample of particles, grams, and

M is the moisture content, percent $H_2O$.

The invention is further described in conjunction with the following examples which are to be considered illustrative rather than limiting, and in which all parts are parts by weight and all percentages are percentages by weight unless otherwise specified.

In the examples the following tests were conducted on the products:

1. Median particle size was determined by use of a Multisizer II Coulter counter (Coulter Electronics, Inc.) according to ASTM C 690-86 but modified by stirring the amorphous precipitated silica for 10 minutes in Isoton® II electrolyte (Curtin Matheson Scientific, Inc.) using a four blade, 4.5 centimeter diameter propeller stirrer.

2. Bulk density was determined using a stainless steel cylinder and a stainless steel cylindrical bar. The cylinder had an internal diameter of 1.6 centimeters (cm) and an internal depth of 9.0 cm. The bar had a length of 10.0 cm and a diameter slightly smaller than the internal diameter of the cylinder such that it could slide freely in the cylinder and permit air within the cylinder to slowly escape. The bar weighed 111 grams. The bar was placed in the empty cylinder and the height expressed in centimeters, $H_0$, of the bar above the top of the cylinder was measured by a securely positioned Fowler depth gauge. Between 0.95 and 1.05 gram of silica was weighed to the nearest milligram. This weight, G, was recorded. The weighed silica was transferred to the cylinder. The cylinder was tapped five times to help settle the silica. The bar was then lowered very slowly into the cylinder. When the weight of the bar was supported by the silica, it was let go. After 2 minutes the height expressed in centimeters, H, of the bar above the top of the cylinder was measured by the Fowler depth gauge. The bulk density, ρ, expressed in $g/cm^3$, was calculated using the following equation:

$$\rho = \frac{G}{2.011(H - H_0)}$$

EXAMPLE 1

Stock aqueous sodium silicate solution was prepared containing about 70 grams $Na_2O$ per liter and having an $SiO_2:Na_2O$ molar ratio of 3.39. Water in the amount of 79.79 liters was placed in a reactor and heated to 81° C. Stock aqueous sodium silicate solution was added such that the concentration of $Na_2O$ in the solution in the reactor was about 2.3 grams per liter. With agitation and over a period of 90 minutes, separate streams of stock aqueous sodium silicate solution and about 96 weight percent aqueous sulfuric acid were added such that the unreacted $Na_2O$ concentration in the reaction mixture remained at about 2.3 grams per liter during the addition. Supplemental high speed mixing was used at the site of acid addition. During the additions twenty times as much sodium silicate was added as was present in the reactor before commencement of the additions. Upon completion of the additions the pH of the reaction mixture was reduced to 8.5 using about 96 weight percent sulfuric acid and the reaction mixture was aged 100 minutes with agitation but with the supplemental high speed mixer shut off. At the conclusion of the aging period the supplemental high speed mixer was started and about 96 weight percent aqueous sulfuric acid was added until the pH was about 4.0. Thirty-five liters of the reaction mixture was diluted with 87.5 liters water. The diluted reaction mixture was then filtered using a plate and frame filter press. The filter cake was removed from the filter press and, together with a small amount of added water, was liquefied by agitation and spray dried. The product was particulate amorphous precipitated silica containing 6.2 percent sodium sulfate by weight and 4.8 percent water by weight. The product had a BET surface area of 159 $m^2/g$, a DBP oil absorption of 233 $cm^3/100$ g, a total intruded volume of 3.14 $cm^3/g$, a median particle size of 20.8 μm, and a bulk density of 0.25 $g/cm^3$.

EXAMPLE 2

The procedure of Example 1 was substantially repeated on a larger scale except that prior to filtering the reaction mixture was diluted with an equal volume of water. The product was particulate amorphous precipitated silica containing 9.7 percent sodium sulfate by weight and 3.6 percent water by weight. The product had a BET surface area of 159 $m^2/g$, a DBP oil absorption of 199 $cm^3/100$ g, a total intruded volume of 2.2 $cm^3/g$, and a median particle size of 26.7 μm.

Comparative Example

A further 35 liters of the reaction mixture of Example 1 was divided into four approximately equal portions. Each portion was filtered on a separate Buchner funnel. Each resulting filter cake was washed on the Buchner funnel with four 2.5-liter aliquots of water. The washed filter cakes were removed from the Buchner funnels and combined. The combined filter cakes, together with a small amount of added water, were liquefied by agitation to form a slurry which was spray dried. The resulting product, which was a control, was particulate amorphous precipitated silica containing 0.22 percent sodium sulfate by weight and 5.0 percent water by weight. The control had a BET surface area of 182 $m^2$/g, a DBP oil absorption of 260 $cm^3$/100 g, a total intruded volume of 3.24 $cm^3$/g, a median particle size of 21.3 μm, and a bulk density of 0.23 g/$cm^3$.

EXAMPLE 3

The dry mixture shown in Table 1 was used for testing dry mix swell:

TABLE 1

| Component | Amount, percent by volume |
| --- | --- |
| Silica | 87.92 |
| UHMWPE(1) | 10.91 |
| Lubricant(2) | 0.23 |
| Antioxidant(3) | 0.16 |
| Carbon Black/polyethylene(4) | 0.78 |

(1)UHMWPE = Ultrahigh Molecular weight polyethylene, GUR 415, Hoechst Celanese Corp.
(2)Petrac ® CZ81, Synpro Corp.
(3)Irganox ® B215, Ciba-Geigy Corp.
(4)Polyblak ® 1850, A. Schulman, Inc.

Dry mix swell is measured by introducing to a Henschel™ vertical high intensity mixer, 23 centimeters in diameter and 22 centimeters in height, a standard weight of the above dry mixture. The mixer was closed and the dry mixture was mixed for about 15 seconds. After mixing had ceased, the pressure release valve was opened to equilibrate the internal pressure with the ambient atmospheric pressure. The mixer lid was opened and after 15 seconds the mix height, $h_m$, expressed in centimeters, was measured with a ruler. The dry mix swell, (DMS), expressed as percent, was calculated using the following equation:

$$(DMS) = 100 \, h_m / 22$$

The dry mix swell is a measure of the degree of aeration of the dry mixture after mixing the batch in the Henschel mixer. Lower values of dry mix swell are desirable because the mixer can process more material per batch.

An exemplary battery separator formulation was used for measuring angle of repose. The exemplary battery separator formulation was formed by admixing 73.52 parts by volume of the above dry mixture with 26.48 parts by volume of Shellflex® 3681 processing oil (Shell Chemical Co.).

The angle of repose was measured by pouring the exemplary battery separator formulation on an 8-mesh screen (US Sieve Series) located 9 centimeters above a jar lid 50 millimeters in diameter. The formulation was is sifted through the screen onto the jar lid by scraping with the end of a plastic ruler. The sifted formulation formed a cone on the lid. Sifting was continued until the cone reached the maximum height. The height of the cone, expressed in millimeters, was measured. The angle of repose was determined from its tangent which is the cone height divided by 25. The angle of repose is a measure of the ease with which the formulation can be processed; the lower the angle of repose, the easier the formulation flows and the easier it can be processed.

Dry mixtures and exemplary battery separator formulations were prepared using the products of Examples 1 and 2 and the Control of the Comparative Example. These were tested for dry mix swell and angle of repose, respectively. The results are shown in Table 2.

TABLE 2

| Silica | Dry Mix Swell, % | Angle of Repose, degrees |
| --- | --- | --- |
| Example 1 | 50.0 | 40.0 |
| Example 2 | 31.8 | 42.6 |
| Control | 63.6 | 50.3 |

Although the present invention has been described with reference to specific details of certain embodiments thereof, it is not intended that such details should be regarded as limitations upon the scope of the invention except insofar as they are included in the accompanying claims.

We claim:

1. Particles comprising particulate amorphous precipitated silica in association with from 5 to 10 percent by weight sodium sulfate and less than 10 percent by weight water, wherein the percentages are based on the weight of the silica, the sodium sulfate, and the water; said particles having a BET surface area of from 100 to 300 $m^2$/g, a total intruded volume from 1.8 to 3.6 $cm^3$/g, and a DBP oil absorption of from 180 to 320 $cm^3$/100 g.

2. The particles of claim 1 wherein the particulate amorphous precipitated silica is in association with less than 8 percent by weight water based on the weight of the silica, the sodium sulfate, and the water.

3. The particles of claim 2 which have a BET surface area of from 120 to 220 $m^2$/g, a total intruded volume from 1.9 to 3.2 $cm^3$/g, and a DBP oil absorption of from 190 to 270 $cm^3$/100 g.

4. The particles of claim 1 wherein the particulate amorphous precipitated silica is in association with less than 6 percent by weight water based on the weight of the silica, the sodium sulfate, and the water.

5. The particles of claim 4 which have a BET surface area of from 140 to 180 $m^2$/g, a total intruded volume from 2 to 3.2 $cm^3$/g, and a DBP oil absorption of from 195 to 240 $cm^3$/100 g.

6. The particles of claim 1 which comprise particulate amorphous precipitated silica in association with from 6 to 8 percent by weight sodium sulfate, wherein the percentage is based on the weight of the silica, the sodium sulfate, and the water.

7. The particles of claim 6 wherein the particulate amorphous precipitated silica is in association with less than 8 percent by weight water based on the weight of the silica, the sodium sulfate, and the water.

8. The particles of claim 7 which have a BET surface area of from 120 to 220 $m^2$/g, a total intruded volume from 1.9 to 3.2 $cm^3$/g, and a DBP oil absorption of from 190 to 270 $cm^3$/100 g.

9. The particles of claim 6 wherein the particulate amorphous precipitated silica is in association with less than 6 percent by weight water based on the weight of the silica, the sodium sulfate, and the water.

10. The particles of claim 9 which have a BET surface area of from 140 to 180 $m^2$/g, a total intruded volume from 2 to 3.2 $cm^3$/g, and a DBP oil absorption of from 195 to 240 $cm^3$/100 g.

* * * * *